(12) United States Patent
Yoshida et al.

(10) Patent No.: US 7,571,436 B2
(45) Date of Patent: Aug. 4, 2009

(54) DEVICE FOR INCREASING THE EXECUTION SPEED OF A LINKED PROGRAM

(75) Inventors: Takehiro Yoshida, Nagoya (JP); Takuji Kawamoto, Nagoya (JP); Masaki Kawai, Seto (JP)

(73) Assignee: Panasonic Corporation, Osaka (JP)

( * ) Notice: Subject to any disclaimer, the term of this patent is extended or adjusted under 35 U.S.C. 154(b) by 806 days.

(21) Appl. No.: 10/814,183

(22) Filed: Apr. 1, 2004

(65) Prior Publication Data

US 2004/0199908 A1 Oct. 7, 2004

(30) Foreign Application Priority Data

Apr. 1, 2003 (JP) .............................. 2003-097892

(51) Int. Cl.
*G06F 9/44* (2006.01)
(52) U.S. Cl. ...................... 717/163; 717/165; 717/162; 717/164; 717/166
(58) Field of Classification Search .......... 717/162–167
See application file for complete search history.

(56) References Cited

U.S. PATENT DOCUMENTS

| | | | |
|---|---|---|---|
| 6,029,207 A | 2/2000 | Heninger | |
| 6,106,574 A * | 8/2000 | Baisley et al. ................ | 717/140 |
| 6,259,958 B1 | 7/2001 | Steinman et al. | |
| 6,339,841 B1 * | 1/2002 | Merrick et al. ............... | 717/166 |
| 6,363,436 B1 * | 3/2002 | Hagy et al. .................. | 719/331 |
| 6,678,886 B2 * | 1/2004 | Kumon ......................... | 717/151 |
| 6,810,519 B1 * | 10/2004 | Hicks .......................... | 717/166 |
| 6,832,302 B1 * | 12/2004 | Fetzer et al. ................. | 711/170 |
| 7,080,373 B2 * | 7/2006 | Plaxton et al. ................. | 718/1 |
| 7,093,241 B2 * | 8/2006 | Hsieh .......................... | 717/153 |
| 2002/0016957 A1 * | 2/2002 | Ishiwata ...................... | 717/146 |
| 2003/0074656 A1 * | 4/2003 | Irino ........................... | 717/162 |

(Continued)

FOREIGN PATENT DOCUMENTS

JP 10-69376 3/1998

(Continued)

OTHER PUBLICATIONS

Cockcroft, Adrian, "Which is better, static or dynamic linking?," Sun World, Feb. 1996, Web Publishing Inc., San Francisco, CA., pp. 1-7.

(Continued)

*Primary Examiner*—Lewis A Bullock, Jr.
*Assistant Examiner*—Insun Kang
(74) *Attorney, Agent, or Firm*—Wenderoth, Lind & Ponack, L.L.P.

(57) ABSTRACT

The speed of execution of linked programs is improved to the extent possible within the limit of the capacity of memory storing linked programs. As initial settings, all class libraries are set for linking. By this means, all class libraries are linked. Then, a judgment is made as to whether there is overflow of memory storing linked programs. If there is overflow, the maximum value of the number of applications using currently linked class libraries is set in variable N. Then, settings are modified such that class libraries used by N or more applications are not linked, and linking is again performed. If memory overflow does not occur, processing ends.

6 Claims, 13 Drawing Sheets

U.S. PATENT DOCUMENTS

2004/0015943 A1 *  1/2004  Chen .......................... 717/168

FOREIGN PATENT DOCUMENTS

WO          98/19237        5/1998
WO          99/32969        7/1999

OTHER PUBLICATIONS

"Dynamic Linking and Loading," Jun. 1999, retrieved from Internet: http://www.iecc.com/linker/linker10.ht, pp. 1-8.

European Search Report of Aug. 1, 2007 issued in European Application EP 04 00 7810.

* cited by examiner

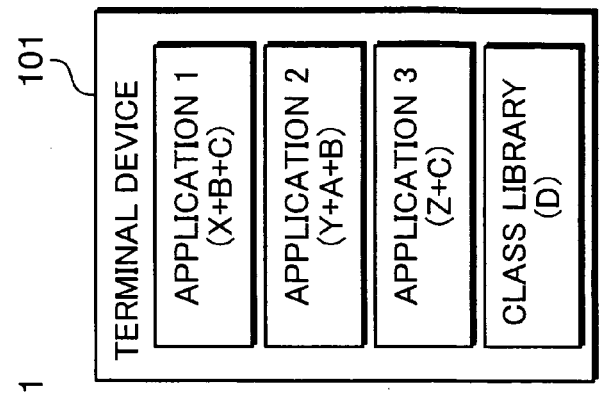
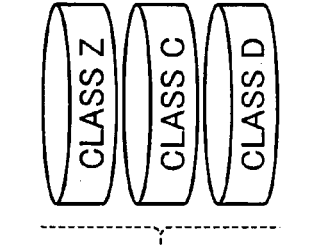
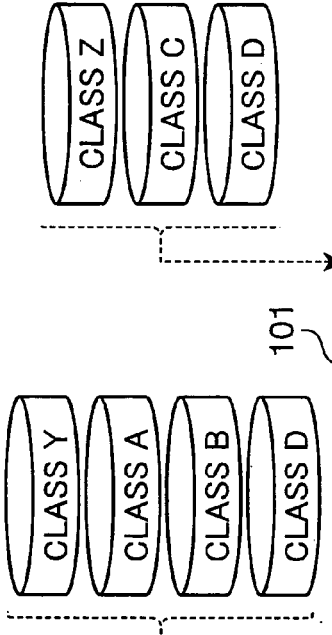
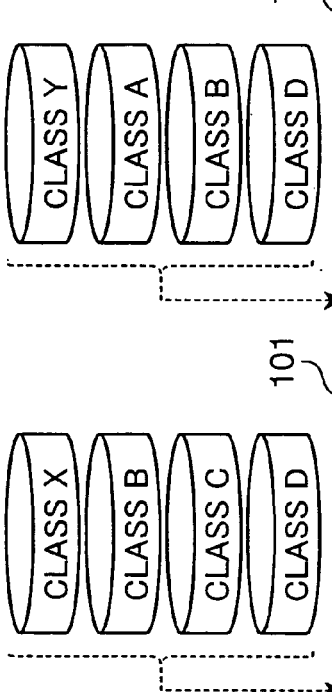

FIG.5A
STEP 3

| APPLICATION 1<br>X+B+C+D | APPLICATION 2<br>Y+A+B+D | APPLICATION 3<br>Z+C+D | TOTAL NUMBER OF CLASS FILES = 11<br>NUMBER OF RUNTIME LINKS = 0 |
|---|---|---|---|

FIG.5B
STEP 4

| APPLICATION 1<br>X+B+C | APPLICATION 2<br>Y+A+B | APPLICATION 3<br>Z+C | TOTAL NUMBER OF CLASS FILES = 9<br>NUMBER OF RUNTIME LINKS = 3 |
|---|---|---|---|
| CLASS LIBRARY D USED BY THREE APPLICATIONS ||||

FIG.5C
STEP 5

| APPLICATION 1<br>X+B+C | APPLICATION 2<br>Y+A+B | APPLICATION 3<br>Z+C | TOTAL NUMBER OF CLASS FILES = 7<br>NUMBER OF RUNTIME LINKS = 7 |
|---|---|---|---|
| CLASS LIBRARIES B,C USED BY TWO APPLICATIONS ||||
| CLASS LIBRARY D USED BY THREE APPLICATIONS ||||

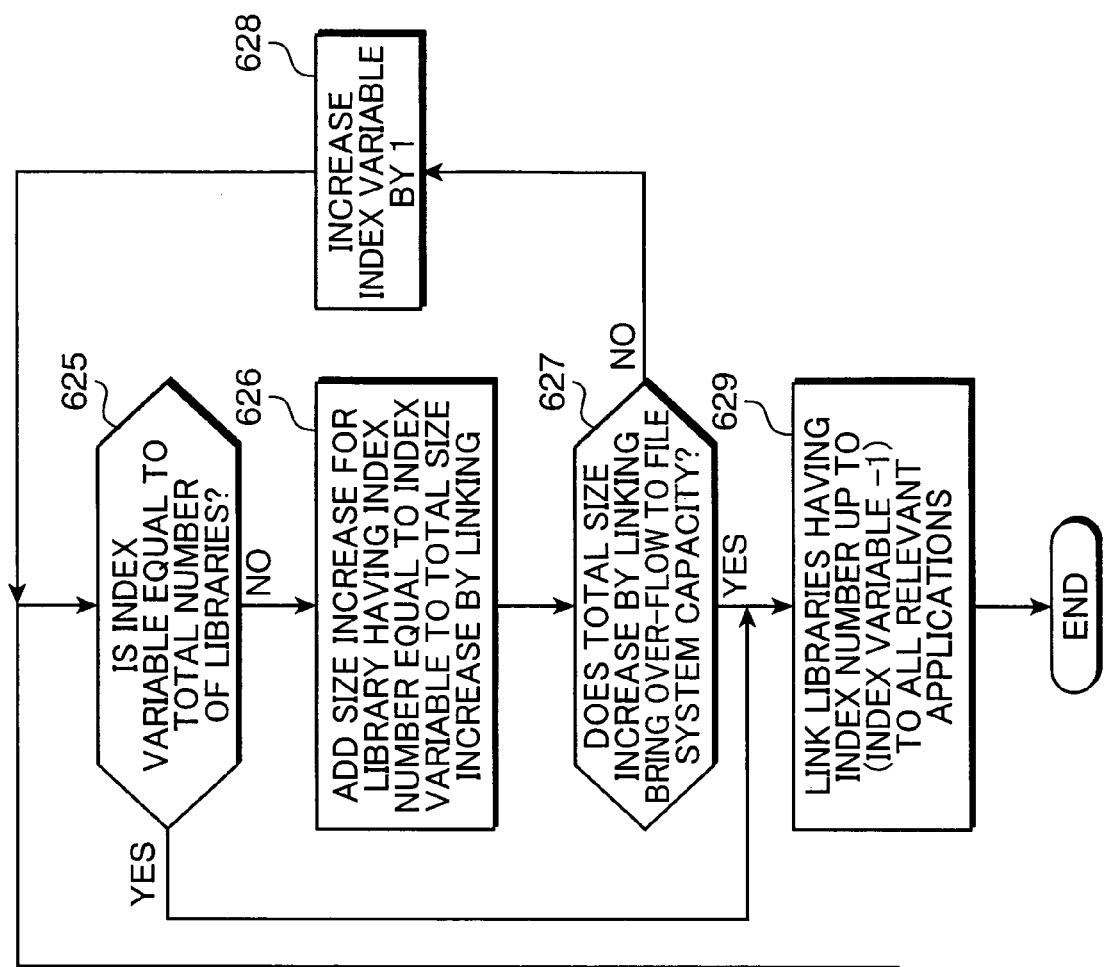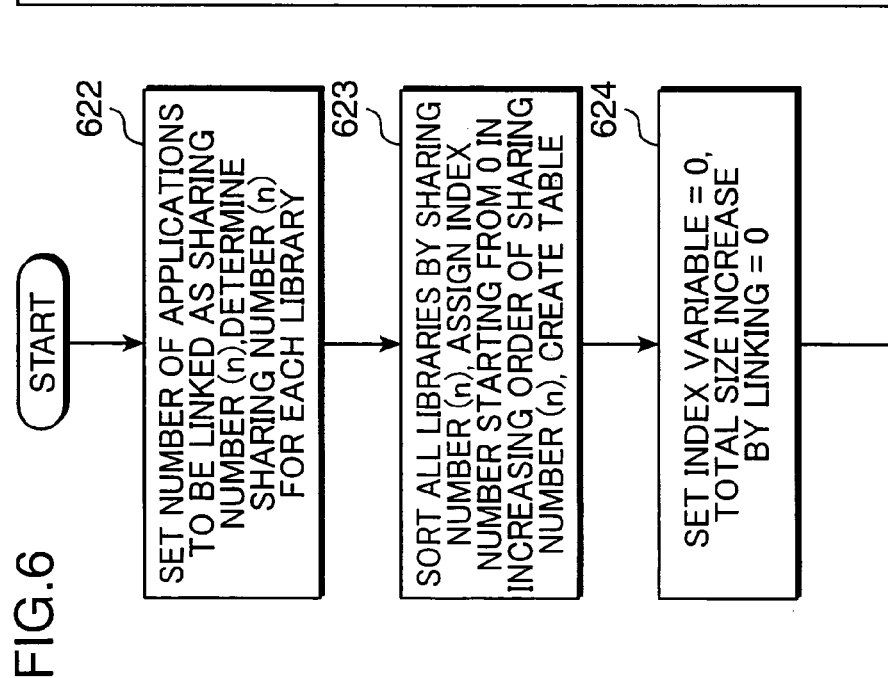
FIG.6

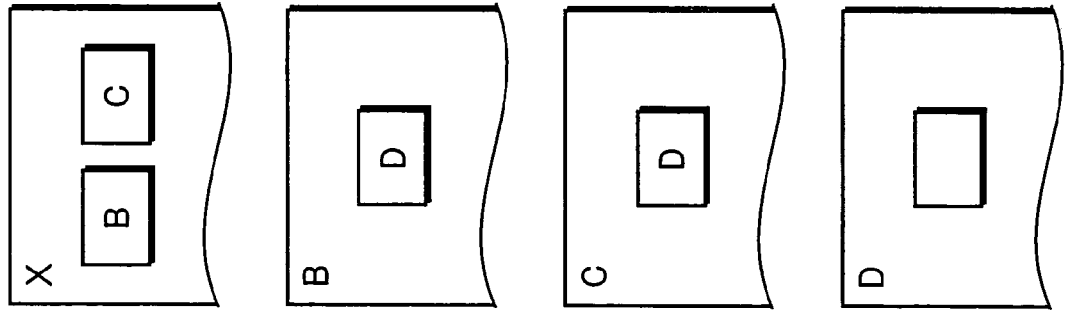
FIG.7C
| | X | Y | Z | SHARING NUMBER (n) |
|---|---|---|---|---|
| A | × | ○ | × | 1 |
| B | ○ | ○ | × | 2 |
| C | ○ | × | ○ | 2 |
| D | ○ | ○ | ○ | 3 |
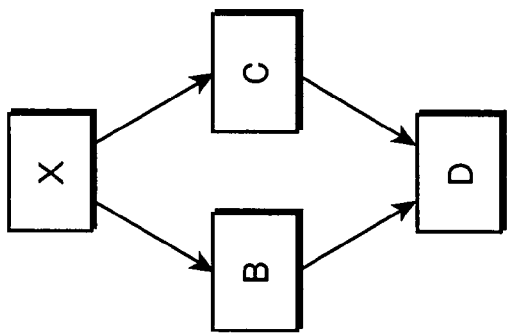
FIG.7B
FIG.7A

FIG.8

| SHARING NUMBER (n) | INDEX NUMBER | LIBRARIES FOR LINKING |
|---|---|---|
| 1 | 0 | A |
| 2 | 1 | B |
| 2 | 2 | C |
| 3 | 3 | D |

DEVICE FOR INCREASING THE EXECUTION SPEED OF A LINKED PROGRAM

BACKGROUND OF THE INVENTION

1. Field of the Invention

The invention of the present patent application relates to a linker which links a plurality of intermediate-language programs, obtained by conversion by a compiler of so-called source programs written in a source language, and more specifically, for example, links programs in which absolute addresses at runtime are not determined and general-purpose library programs, to create for example an object program in which absolute addresses at runtime are determined. However, the above-described determination of absolute addresses at runtime is merely one example, to which the present invention is not limited.

The invention of the present patent application relates in particular to a linker for programs written in for example the Java (R) language (in this specification, an "(R)" appended to a product name indicates that the product name is a registered trademark) which is executed on portable equipment and various other devices with significant limitations on the memory size of the execution environment. However, this also is merely one example, to which the present invention is not limited.

2. Description of the Related Art

In the prior art, linkers which link a plurality of programs written in the Java (R) language or C language to create an executable program have, for example, been described in Japanese Patent Laid-open No. 10-069376 and in the national publication of a translation of the international patent application 2000-514584. For example, in a conventional Java (R) execution environment, the Java (R) source code for an application program is converted into bytecodes which are an intermediate language, and stored as files in class units.

When the application is started, necessary portions from these class files are loaded, and by linking these an executable program is created. This method is called a runtime linking method. A program using this method and the flow of the processing are shown in FIG. 12. In the example of FIG. 12, the programs for class A, class B, class X, and class Y, written in an intermediate language, are stored on the server 909. In conventional runtime linking methods, these four programs are loaded and stored in advance on the terminal device 901.

For example, suppose that an application program 902 is created by linking programs from class A, class B and class X among the classes. When the application program 902 is started on the terminal device 901, the linker (i.e., the program linking program) performs runtime linking. Specifically, the linker creates and supplies for execution the application program 902 by linking programs from class A, class B, and class X.

Further, suppose that programs from class A, class B, and class Y among the classes can be linked to create an application program 903. When this application program 903 is started on a terminal device 901, the linker performs runtime linking. That is, the linker creates and provides for execution the application program 903 by linking programs from class A, class B, and class Y.

On the other hand, in for example a conventional C language execution environment, a source program is converted into an object program by compiling, and at the same time the necessary libraries are linked in advance to create and store an executable file. When the application is started, the executable file is loaded and executed.

This method is called advance linking. A program employing this method and the flow of the processing are shown in FIG. 13. In the example of FIG. 13, programs from class A, class B, class X, and class Y, written in an intermediate language, are for example stored on a server 929. These programs are linked in advance by the server 929, to create the application program 922 and the application program 923.

The terminal device 921 loads and stores these application programs 922 and 923. When either the application program 922 or the application program 923 is started, the terminal device 921 can immediately execute the program.

In the runtime linking method shown in FIG. 12, one intermediate-language program is loaded and stored by the terminal device 901 from each of class A, class B, class X, and class Y. Hence there is no need for redundant storage of libraries, and the required storage space can be reduced. This is an important advance for equipment, such as portable equipment, in which the capacity of the storage portion is limited. However, the runtime linking method entails linking after the application is started, so that there is the drawback that considerable time is required from application startup until actual execution.

In contrast, the advance linking method shown in FIG. 13 performs linking in advance to create an executable file, so that when the application is started immediate execution is possible. This is a major advantage of the advance linking method. On the other hand, because linking is performed in advance, the terminal device 921 must redundantly store class A and class B, which are libraries used in common by the application program 922 and by the application program 923. This is a major disadvantage for equipment, such as portable equipment, in which the capacity of the storage portion is limited.

BRIEF SUMMARY OF THE INVENTION

The present invention was devised in light of the above-stated problem, and has as an object the provision of a program linking program, program product, program linking device, terminal device, and program linking method enabling improvement, to the extent possible, of the speed at runtime of a linked program, within the limits of the capacity of the memory storing the linked program.

In order to resolve the above-stated problems and attain the above-stated objects, one aspect of the present invention is directed to a program linking program, which causes a computer having a memory to function as: linking means, to link one or a plurality among plural unlinked programs, advancing toward the completion of one or more linked programs; storage means, to cause the memory to store the one or more linked programs, either before or after completion; and, management means, to cause the linking means to preferentially perform linking of the plural unlinked programs in predetermined priority order and to a maximum limit, within a range in which overflow of a predetermined capacity of the memory does not occur.

In the present invention, "predetermined capacity of memory" need not be the entire capacity of the memory, but may be a capacity allocated arbitrarily to the memory for storage of linked programs.

BRIEF DESCRIPTION OF THE DRAWINGS

FIGS. 4A through 4D show structural changes in class libraries in the process of execution of linking according to the first embodiment of the present invention;

FIGS. 5A through 5C shows the number of class libraries and number of links in the process of execution of linking according to the first embodiment of the present invention;

FIG. 6 shows the processing flow of a terminal device executing linking according to a second embodiment of the present invention;

FIGS. 7A through 7C are explanatory diagrams to explain the procedure to create a table in the processing of FIG. 6;

FIG. 8 illustrates an example of a table created in the processing of FIG. 6;

DETAILED DESCRIPTION OF THE INVENTION

Figure 1:
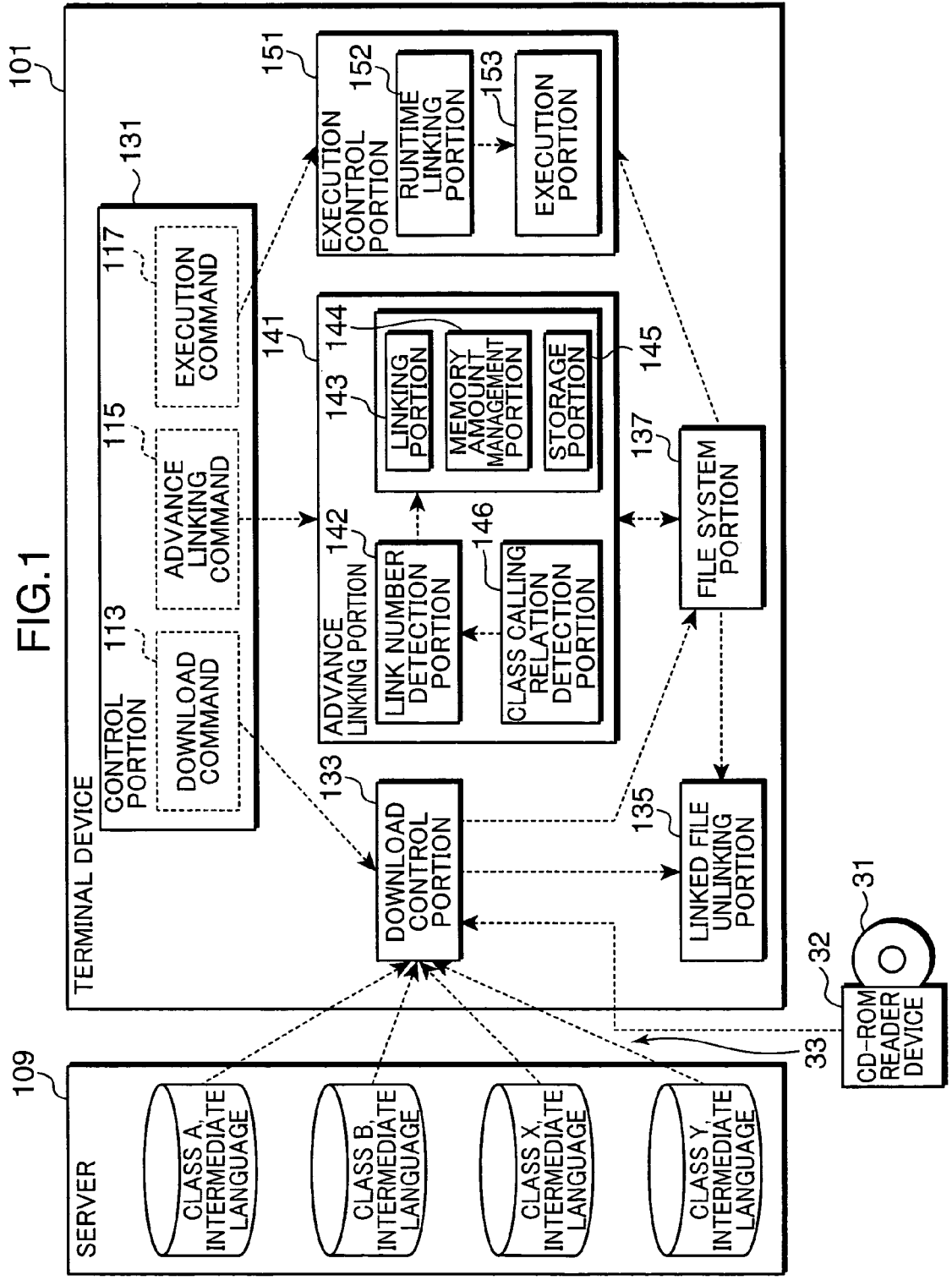
FIG. 1 is a block diagram of a terminal device which performs linking according to a first embodiment of the present invention.

Preferred embodiments of the invention of the present patent application (hereafter also called "the present invention") are explained in detail, referring to the drawings.

First Embodiment

FIG. 1 shows a block diagram of a terminal device according to a first embodiment of a program linking device of the present invention which executes the program linking program or program linking method (hereafter also abbreviated to simply "linking") of the present invention. Specific examples of such a terminal device 101 include portable telephones, portable information terminals (e.g., PDAs, Personal Digital Assistants) and other portable information equipment, personal computers and other information equipment, various household electrical products, electronic office equipment, and other control devices controlled by microcomputers.

The terminal device 101 downloads and executes an intermediate-language program from other equipment, such as a server 109 in FIG. 1. However, the server 109 is one example, and the other equipment is not necessarily limited to the server 109 but may be various other electronic equipment, such as an ordinary personal computer or other electrical product. An advance linking portion 141 principally performs linking in the terminal device 101. It is the advance linking portion 141 that performs linking according to a program linking program. Below, the configuration and operation of the terminal device 101 are explained, referring to FIGS. 1 through 3, FIGS. 4A through 4D, and FIGS. 5A through 5C, with emphasis on operation of the advance linking portion 141.

The terminal device 101 executes various applications. For example, the terminal device 101 executes an application program 1, an application program 2 and an application program 3 shown in FIGS. 4A to 4D and in FIGS. 5A to 5C. In order to simplify descriptions, in the specification and drawings, "application program" will sometimes be shortened to simply "application."

These application programs comprise a number of class libraries written in an intermediate language. These intermediate-language class libraries are stored in the server 109. In FIG. 1, the server 109 is described as having only four classes, which are class A, class B, class X, and class Y, but of course other classes may be present. The server 109 stores all other required classes as well, but these are omitted in FIG. 1.

When a control portion 131 of the terminal device 101 executes a download command 113, these class libraries are downloaded from the server 109 to the terminal device 101. These class libraries are downloaded via various transmission media 33, such as the Internet, a LAN, CATV cable, satellite link, telephone lines, ISDN lines, ATM lines, or some other network. The transmission media 33 is not limited to wire transmission media, but may be wireless transmission media as well.

These class libraries may also be read into the terminal device 101 in so-called package form, that is, in a state of being recorded on some package media or other recording media 31. FIG. 1 depicts a CD-ROM disc as the recording media 31. The class libraries recorded on the CD-ROM disc can be read through the download control portion 133 by connecting a CD-ROM reader device 32 to the terminal device 101. The program linking program to realize the functions of the advance linking portion 141 can also be received by the terminal device 101 through transmission media 33 or recording media 31.

Designation of the class libraries to be downloaded may for example take the following forms. (1) A particular application is designated among the applications to be executed by the terminal device 101, and the class libraries necessary for execution of the designated application are downloaded; (2) the class libraries necessary for execution of all the applications which can be executed by the terminal device 101 are downloaded; (3) all the class libraries held by the server 109 are downloaded; or, (4) class libraries are designated by various methods, and the designated class libraries are downloaded.

The download control portion 133 performs downloading. Downloaded class libraries are stored in the file system portion 137. The download control portion 133 corresponds to a specific example of the acquisition unit of the present invention. The file system 137 corresponds to a specific example of the memory and the storing unit of the present invention.

When the control portion 131 executes an advance linking command 115, advance linking of downloaded class libraries which are stored in the file system portion 137 is performed. As stated above, by performing linking in advance prior to execution of each application, the speed upon execution is improved. Execution of an advance linking command 115 may be performed in synchronization with the download, or simultaneously with download, or may be performed at a predetermined time, or may be performed in accordance with some operation by a user, or may be performed with some other timing.

The control portion 131, by executing the advance linking command 115, executes control causing the advance linking portion 141 to perform advance linking processing. Thereby, the advance linking portion 141 performs advance linking processing using the following procedure (FIG. 2, 220).

Figure 2:
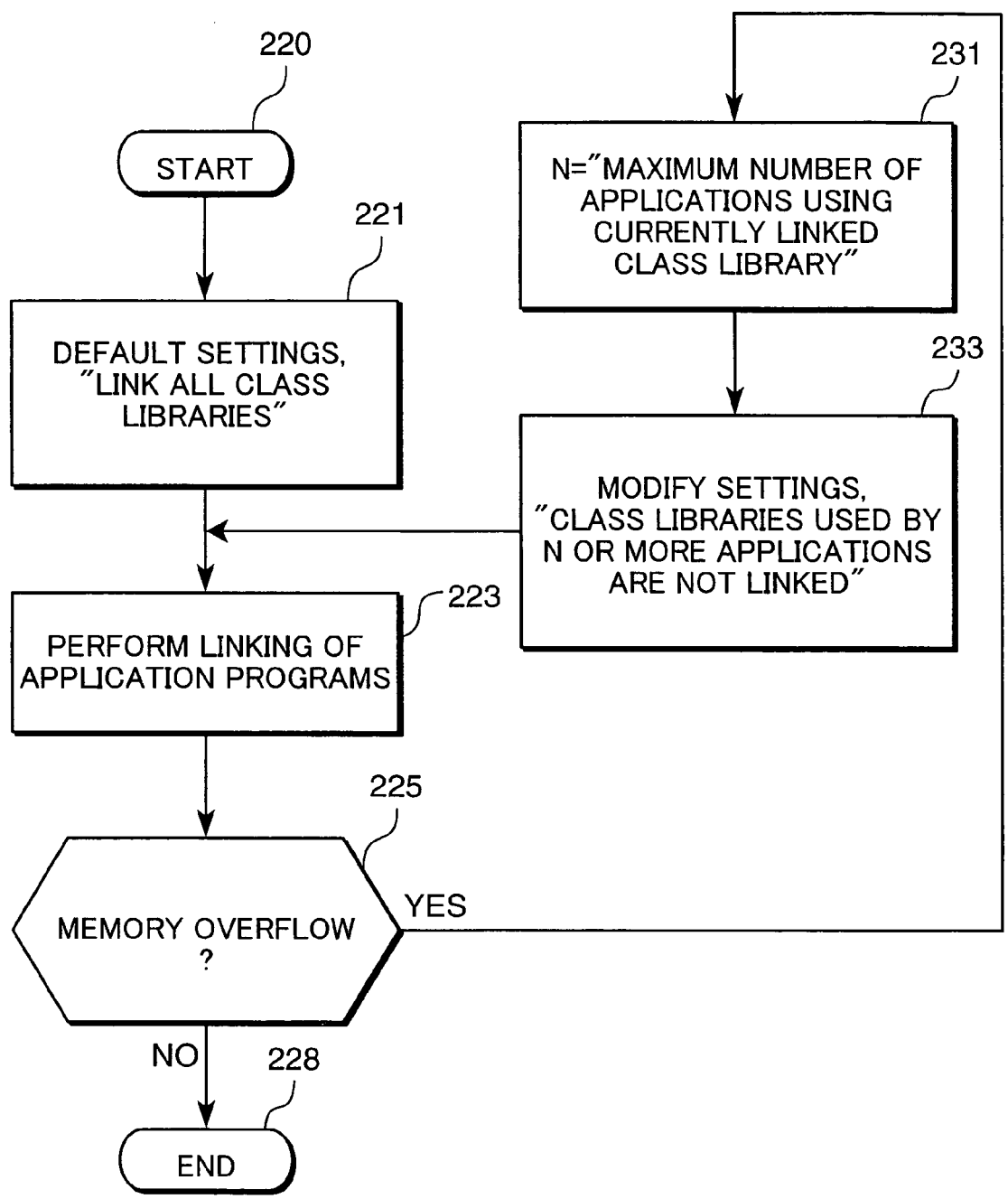
FIG. 2 is a diagram of the processing flow of a terminal device which performs linking according to the first embodiment of the present invention.

The advance linking portion 141 first sets all class libraries for linking (FIG. 2, 221). The class calling relation detection portion 146 detects the class libraries called by each application, further detects class libraries which are called by class libraries which have been called, and repeats this processing. The other class libraries called by a class library are for example described in the header for the calling class library (see FIG. 7A).

A class library which is detected as being called is linked by a linking portion 143 (FIG. 2, 223). A storage portion 145 stores a linked program generated by the linking portion 143 in the file system portion 137. This linking may be accompanied by determination of runtime addresses, or may not necessarily result in final determination of runtime addresses, and other cases are possible as well. When the linking portion 143 performs linking processing, a memory amount management portion 144 manages the memory amount (i.e., remaining capacity) of the file system portion 137, which changes as a result of each linking. The linking portion 143 corresponds to a specific example of the linking means of the present invention. The memory amount management portion 144 corresponds to a specific example of the management means of the present invention. Further, the storage portion 145 corresponds to a specific example of the storage means of the present invention.

By repeating the process the necessary number of times, linking ends for all the application programs which can be executed by the terminal device 101, or which must be executed, or which have been designated (FIG. 2, 223). At this time, the memory amount management portion 144 confirms the memory amount (i.e., the remaining capacity) of the file system portion 137 being managed, and judges whether the programs fit within the capacity thereof, or whether memory overflow has occurred (FIG. 2, 225). If the programs fit into the memory capacity of the file system portion 137 ("no" in 225), then all the application programs were linked normally, and advance linking ends (FIG. 2, 228). The memory amount of the file system portion 137 managed by the memory amount management portion 144 is not necessarily the total memory amount (i.e., total capacity) of the file system portion 137. A memory amount may be one allocated arbitrarily, from among the total memory amount of the file system portion 137, for storing linked programs.

If overflow of the memory capacity of the file system portion 137 has occurred ("yes" in 225), then the link number detection portion 142 determines the class library used by the greatest number of applications from among the class libraries currently used in links, and determines the number of applications using the class library (equivalent to the maximum value) (FIG. 2, 231). For convenience in explanation, this number is taken to be N (FIG. 2, 231).

The advance linking portion 141 is initially set to "perform linking of all class libraries", but subsequently the settings are changed to "do not link class libraries used by N or more applications" (FIG. 2, 233). Then the advance linking portion 141 releases the links in all application programs for which linking has already been performed, and then the linking portion 143 again performs linking of all applications according to the new settings (FIG. 2, 223).

Here, as the method for releasing the links in all applications which have already been linked, there is a method of dissolving links in linked programs, a method of separately saving programs before linking, and any other methods may be used as well. For example, a method can be adopted in which unlinked class libraries are saved in the download control portion 133, or a method can be used in which the download control portion 133 downloads the unlinked class libraries from the server 109. Or, a linked file unlinking portion 135 can dissolve the links of linked programs, and again pass the programs to the file system portion 137. Any of these methods may be used. In the form in which unlinked class libraries are stored in the download control portion 133, the download control portion 133 corresponds to a specific example of both the acquisition unit and the storing unit of the present invention.

For example, suppose that, as described above, applications to be executed by the terminal device 101 are the application 1, application 2 and application 3 shown in FIGS. 4A to 4D and FIGS. 5A to 5C. In this case, the class libraries necessary for execution of all applications are X, Y, A, B, C, D, and Z (only the symbols identifying the class libraries are given for simplicity; similarly below), and these are downloaded from the server 109 and stored.

Through execution of the links for all the application programs (FIG. 2, 223), step 1, step 2, and step 3 shown in FIGS. 4A through 4C are executed. As a result, the application program 1, application program 2 and application program 3, in which all the class libraries of the terminal device 101 are linked, are created (FIG. 4C and FIG. 5A, step 3). In this state, all class libraries are already linked, so that there is no need for the runtime linking portion 152 of FIG. 1 to again perform linking at runtime, and the number of links to be made upon execution is 0 (FIG. 5A, step 3).

However, while the total number of class libraries, not including redundancies, is seven, the total number of class libraries including redundancies is 11, with four libraries stored redundantly (FIG. 5A, step 3). These four redundant class libraries are two instances of D, and one each of B and C. The possibility of overflow of the memory capacity of the file system portion 137 is increased by these four redundant class libraries.

Hence among these class libraries, the library used in the greatest number of application programs is detected by the link number detection portion 142 (FIG. 2, 231). In the present example, this class library is D, which is used in all three applications (FIG. 5B, step 4). Hence the N is 3. Hence subsequently the settings are revised to "do not link class libraries used in three or more applications" (FIG. 2, 233), and all links are once again made (FIG. 2, 223).

In step 4 of FIG. 4D, it is stated that the links to class library D are released, and thus it is not necessary that the links to all class libraries be released before re-linking. For example, a method may be employed in which only class libraries used in three or more applications are detected and these links released.

Figure 3:
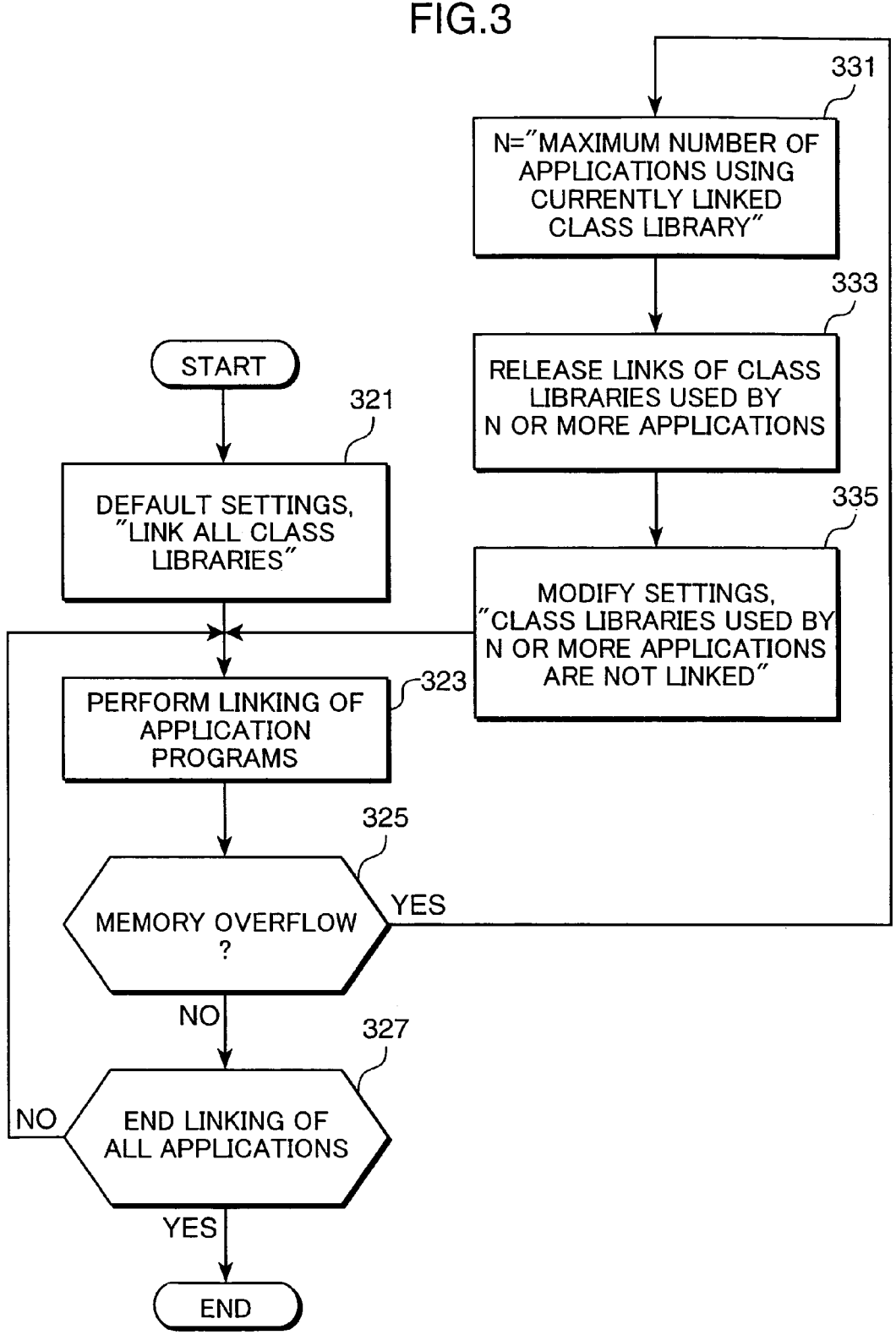
FIG. 3 is a diagram of the processing flow of a terminal device which executes modification of linking according to the first embodiment of the present invention.

In the method shown in FIG. 2, after linking of all applications is once executed, the memory amount management portion 144 detects overflow of the memory capacity. On the other hand, as shown in FIG. 3, the memory amount management portion 144 may detect memory capacity overflow (FIG. 3, 325) each time linking of one application is performed (FIG. 3, 323). FIG. 3 shows an example in which, when memory overflow occurs ("yes" in 325 of FIG. 3), links to class libraries used in N or more applications are released (FIG. 3, 333). However, in step 333, all links to applications already linked may be released. Also, class libraries may be saved as components, and in step 333 all applications already linked can be deleted, and class libraries which have been saved can be linked from the start in step 323. The essential portions are the same in FIG. 2 and FIG. 3, so that detailed explanation of the procedure of FIG. 3 is omitted.

In the state in which the links of class library D have been released, it is necessary to perform linking to class library D at runtime for all the application programs 1 through 3, and so the number of necessary runtime links is 3 (FIG. 5B, step 4). Hence although the speed at the time of execution is reduced somewhat, the number of all class libraries, including redundancies, is 9 (FIG. 5B, step 4), i.e., the number of class libraries stored redundantly is reduced by two. To this extent, the possibility of overflow of the memory capacity of the file system portion 137 is reduced. The two redundant class libraries are one for each of B and C.

Hence in 225 of FIG. 2 the possibility of memory overflow in the second cycle is reduced compared with the previous cycle. If memory overflow does not occur, processing then ends (FIG. 2, 228). However, suppose that even in this case, overflow of the memory capacity of the file system portion 137 occurs (FIG. 2, 225). This case, for the current example, is equivalent to detection of memory overflow even in the second-cycle judgment of step 225 in FIG. 2.

In this case, once again the currently linked class library that is used the most often is detected by the link number detection portion 142 in step 231 of FIG. 2. As indicated by step 5 in FIG. 5C, these are the class libraries B and C, both of which are used in two applications.

Hence the settings are next modified to "do not link a class library used in two or more applications" (FIG. 2, 233, second cycle). Once again all the links are released, thereafter links are executed a third time in step 223 of FIG. 2. To recapitulate, in the first cycle, links were formed for all class libraries; in the second cycle, class libraries used in three or more applications were not linked; and in this third cycle, class libraries used in two or more applications are not linked. Or, instead of releasing all links, only links to class libraries used in two or more applications may be released.

The state after performing linking in the third cycle is shown in step 5 of FIG. 5C. In this state, the class libraries D, B and C have not been linked, so that when applications are executed, linking to the required class libraries among these class libraries is necessary. Hence the number of links necessary upon execution is 7. This is because, when application 1 is executed, in terms of the class library X, this X requires three links, to B, C and D; when application 2 is executed, the class libraries Y and A are already linked, but two links, to B and D, are required; and when application 3 is executed, in terms of the class library Z, this Z requires two links, to C and D.

Hence the speed upon execution is reduced somewhat. However, at least the class libraries Y and A required by application 2 are already linked, and to this extent the speed upon execution is improved over the case in which no advance linking at all is performed.

On the other hand, there exist no class libraries which are stored redundantly. Hence in this sense, there is no wasted memory capacity whatsoever. This is because the condition "do not link class libraries used by two or more applications" means "link only class libraries used by only one application"; this condition clearly implies that redundant storage of class libraries cannot occur.

When the control portion 131 of the terminal device 101 of FIG. 1 executes the execution command 117, the execution control portion 151 is instructed to execute an application. The control portion 131 initiates execution of the execution instruction 117 through some operation by a user, an instruction, control by other equipment, or due to time elapsing or some other startup mechanism. Ordinarily, application startup is performed designating the application to be started, which in this example may be application 1, application 2, or application 3. The execution control portion 151 receives designation of an application among those stored in the file system portion 137, and executes the application.

When the execution control portion 151 is instructed to execute a particular designated application, the runtime linking portion 152 of the execution control portion 151 judges whether it is still necessary to link any class libraries in order to execute the application. If the runtime linking portion 152 judges that linking is necessary, linking of the class library (or libraries) judged to be necessary is performed.

For example, in the state of step 3 in FIG. 5A, even if the application to be executed is designated, there exist no class libraries which must be linked at runtime. On the other hand, in the state of step 4 in FIG. 5B, if one of the applications 1 through 3 is designated, runtime linking of the class library D is necessary. Hence the runtime linking portion 152 performs linking of this class library D.

In the state of step 5 in FIG. 5C, if execution of application 1 is designated it is necessary to perform runtime linking of the class libraries B, C and D. Hence the runtime linking portion 152 performs linking of these class libraries B, C and D. If execution of application 2 is designated in the state of step 5 in FIG. 5C, runtime linking of class libraries B and D is necessary, and so the runtime linking portion 152 performs linking of these class libraries B and D. If execution of application 3 is designated in the state of step 5 in FIG. 5C, then runtime linking of class libraries C and D is necessary, and so the runtime linking portion 152 performs linking of these class libraries C and D.

After linking of all class libraries required for execution is thus performed, the execution portion 153 executes the application program. The execution control portion 151 corresponds to a specific example of the execution control unit of the present invention. Also, the runtime linking portion 152 corresponds to a specific example of the runtime linking unit of the present invention.

Second Embodiment

Next, the program linking program, program linking method, program linking device, and terminal device according to a second embodiment of the present invention will be explained. However, only those portions which are inherently different from the above-described first embodiment are explained, and explanations of portions which are the same as in the first embodiment are omitted. The block diagram of the terminal device according to the second embodiment up to the sixth embodiment of the present invention described below is the same as for the terminal device 101 of FIG. 1.

Similar to the first embodiment, in the second embodiment, if overflow of the memory capacity of the file system portion 137 does not occur when linking of all application programs is performed, then linking is performed for all the application programs and advance linking ends normally. Similar to the first embodiment, in the second embodiment, if overflow of the memory capacity of the file system portion 137 occurs, then linking is performed preferentially beginning from those class libraries which are to be linked to a smaller number of applications.

However, the procedure to preferentially perform linking of class libraries for a smaller number of applications according to the second embodiment differs in essence from that according to the first embodiment. This procedure is explained below, referring to FIG. 6.

In the first embodiment, judgment of whether overflow of the memory capacity of the file system portion 137 is performed by actually performing all the linking. However, actually performing linking in order to judge the overflow of the memory capacity is inefficient in some cases. Hence in the second embodiment, prior to actually performing linking, a memory size check is performed, and the largest number of libraries which can be accommodated in the memory of the file system portion 137 are determined in advance based on the above-stated priority criteria. In the second embodiment, actual linking is performed only for the library determined, after the determination.

FIG. 6 shows the processing procedure of the terminal device of the second embodiment. In the procedure of FIG. 6, first the link number detection portion 142 of the advance linking portion 141 defines, for each library, the number of links to the library from applications, i.e., the number of applications to be linked to the library, as the "sharing number". This value is denoted by (n). The procedure of FIG. 6 determines the sharing number (n) by investigating the class calling relations for each library (FIG. 6, 622).

FIGS. 7A through 7C explain the process by which the link number detection portion 142 computes the sharing number (n). The class calling relation detection portion 146 of the advance linking portion 141 first investigates the class calling relations of each class library. As shown in FIG. 7A, an identification symbol for a class library to be called is added to, for example, the header portion of each class library. In the example of FIG. 7A, the class library X contains a statement indicating that the class libraries B and C are called. The class libraries B and C contain a statement indicating that class library D is called. The class library D contains no statement describing calling.

The class calling relation detection portion 146 can ascertain the class calling relations shown in FIG. 7B for the application 1 by reading the identification symbols examples of which appear in FIG. 7A. The class calling relation detection portion 146 similarly ascertains class calling relations for the applications 2 and 3. As a result, the class calling relation detection portion 146 can create, as a working table, the portion of the table an example of which appears in FIG. 7C, omitting the vertical column relating to the sharing number (n). The class calling relation detection portion 146 secures storage area in, for example, the file system portion 137, and stores the newly created working table in this storage area.

The example table of FIG. 7C indicates that the class calling relation detection portion 146 has ascertained that, with respect to application 1, the class library X should link to B, C and D; with respect to application 2, the class library Y should link to A, B and D; and with respect to application 3, the class library Z should link to C and D. That is, the class calling relation detection portion 146, by ascertaining class calling relations for each application, creates each of the vertical columns of a working table, an example of which is shown in FIG. 7C.

The link number detection portion 142 of the advance linking portion 141 then computes the sharing number (n) for each of the class libraries A, B, C and D, based on the working table. Specifically, the link number detection portion 142 determines the sum of the number of class calling relations for each horizontal row of the working table, and takes the sum to be the sharing number (n). By this means, the link number detection portion 142 can create a working table with vertical columns corresponding to the sharing number (n) added as shown in FIG. 7C. The link number detection portion 142 calculates, for class library D, for example, that the sharing number (n)=3.

Returning to FIG. 6, next the link number detection portion 142 sorts all the libraries by the sharing number (n), arranging them in order from the smallest value of (n), assigns index numbers starting with 0 (zero), and creates a table (FIG. 6, 623). That is, the link number detection portion 142 creates a table such as that illustrated in FIG. 8, based for example on a provisionally created working table (an example of which appears in FIG. 7C). The table of FIG. 8 corresponds for example to a sharing number (n)=2, holds 1 as an index number, and holds B as a class library. The link number detection portion 142 may for example store the table thus created in the storage region of the file system portion 137. The link number detection portion 142 may simultaneously delete the working table from the file system portion 137.

The order of libraries having the same value of (n) may be set in any manner, or a different method may be used to set the order. For example, with respect to the ordering of libraries having the same value of (n), the judgment criteria to be explained in the following third through sixth embodiments of the present invention can be used.

Returning again to FIG. 6, next the memory amount management portion 144 prepares an "index variable" and "total size increase by linking" as two variables necessary for processing, and initializes both to 0 (zero) (FIG. 6, 624). From this step, processing enters a loop. First, the memory amount management portion 144 judges whether the index variable value is equal to the total number of libraries (FIG. 6, 625). This is in order to judge whether linking to all libraries has been completed without memory overflow. That is, if linking to all libraries is completed without memory overflow, this judgment is equivalent to the index variable value being equal to the total number of libraries.

However, in the initial loop iteration the index variable value is zero, and the total number of libraries is 1 or greater, so that the two are not equal. Hence the memory amount management portion 144 adds to the "total size increase by linking" the size increase for the library the index number of which is equal to the index variable (FIG. 6, 626).

Figure 10:
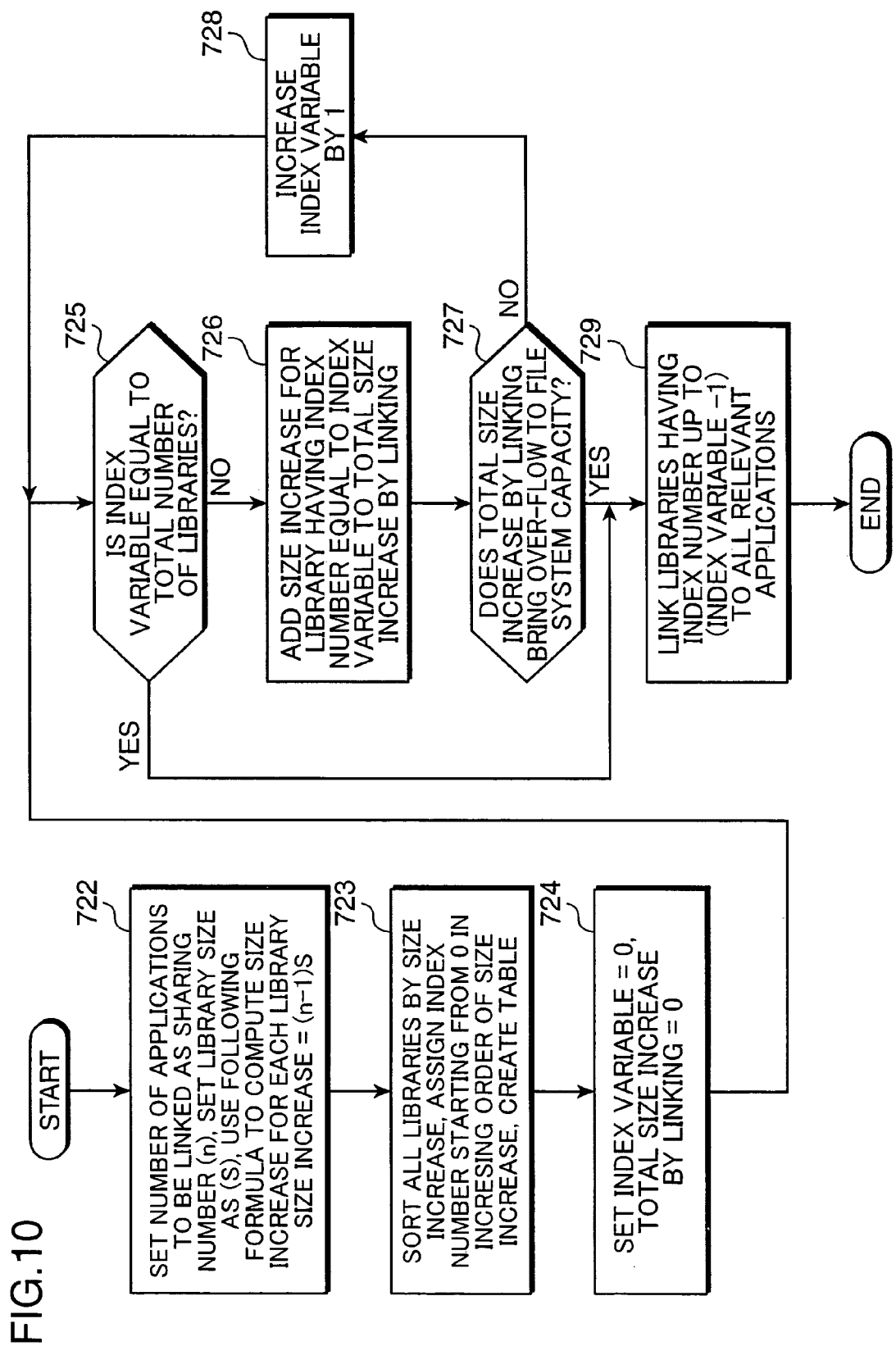
FIG. 10 shows the flow of processing of a terminal device which performs linking according to a third embodiment of the present invention.

Here the "size increase" for a library, though not stated in FIG. 6, is the product of the memory size of the library and the number of applications, minus 1, which link to the library (see FIG. 10, 722). That is, the size increase for a library is equivalent to the memory capacity which becomes necessary for linking to the library (i.e., the amount by which the required memory capacity increases). At this stage, the memory amount management portion 144 judges whether the "total size increase by linking" is such as to cause memory overflow of the memory capacity of the file system portion 137 (FIG. 6, 627).

If at this stage the "total size increase by linking" causes overflow of the memory capacity of the file system portion 137 ("yes" in 627 of FIG. 6), if the library with the index number equivalent to the current "index variable" is linked, memory overflow occurs. Hence the linking portion 143 of the advance linking portion 141 performs linking up to one library before this, i.e., up to the library whose index number is one less than the current index variable value (FIG. 6, 629).

If the total size increase by linking does not cause overflow of the memory capacity of the file system portion 137 ("no" in 627 of FIG. 6), memory overflow will not occur even if the library with the index number equal to the current index variable is linked. Hence the memory amount management portion 144 then increases the "index variable" by 1 (FIG. 6, 628). Then, processing returns to the beginning of the loop, and a judgment is made as to whether linking is confirmed for all libraries (FIG. 6, 625).

In the judgment of step 625 in FIG. 6, if the value of the "index variable" becomes equal to the total number of libraries ("yes" in 625 of FIG. 6), this means that confirmation has ended for all libraries, and all libraries can be linked. As a result, the linking portion 143 can perform linking of all libraries (FIG. 6, 629). On the other hand, if confirmation has not ended for all libraries ("no" in 625 of FIG. 6), the memory amount management portion 144 adds the size increase for the next library to the "total size increase by linking" (FIG. 6, 626), and repeats judgment of whether linking is possible (FIG. 6, 627).

As explained above, this second embodiment differs inherently from the first embodiment in that, prior to actually performing linking, the range of libraries which can be linked is first confirmed, and differs in the procedure therefor. Hence explanations of other portions of the second embodiment are omitted.

Figure 9:
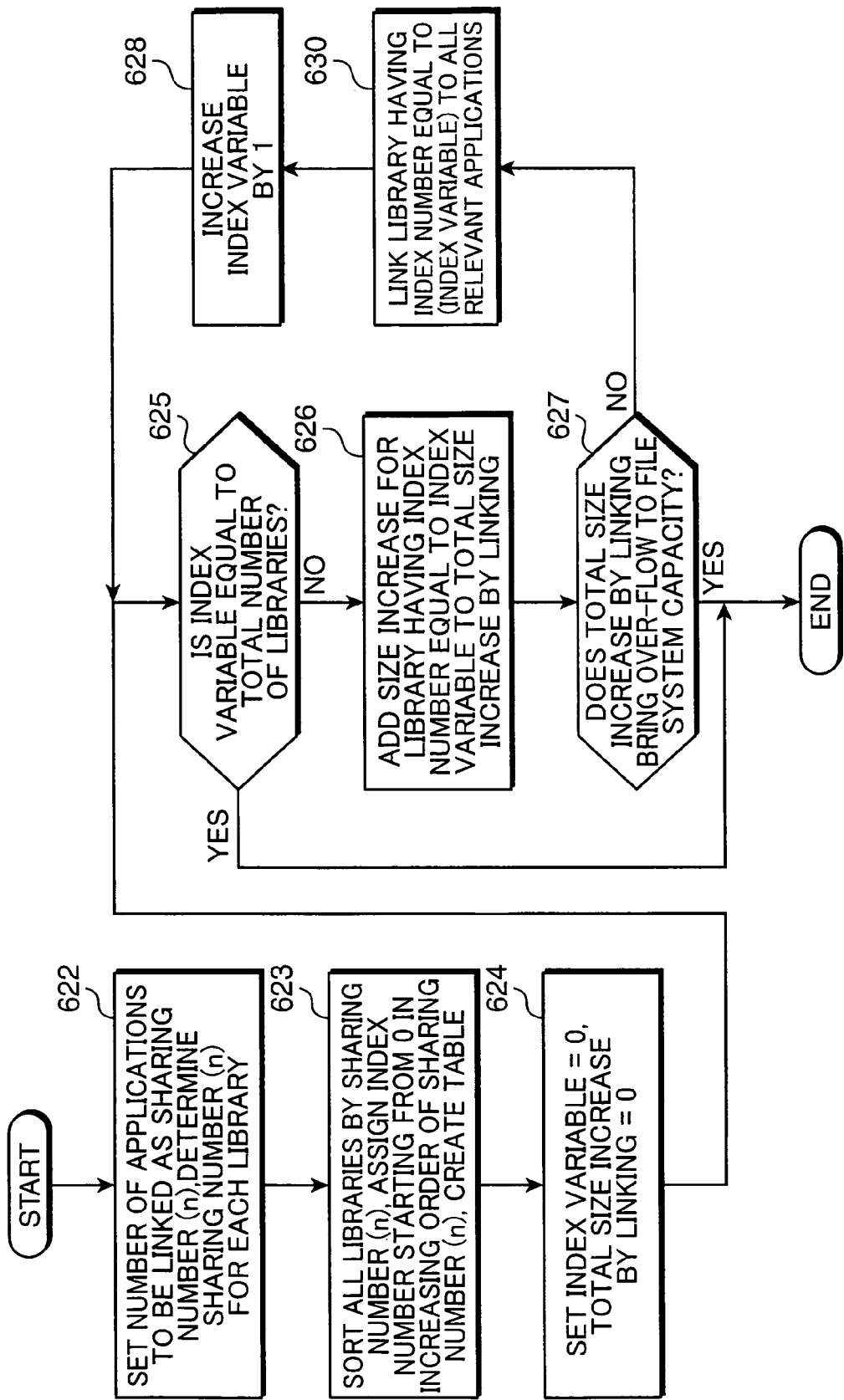
FIG. 9 shows the flow in a modified form of the processing of FIG. 6.

In the processing procedure of FIG. 6, after the upper limit of the "index variable" for which overflow in the file system portion 137 does not occur is determined, the linking portion 143 performs linking to all class libraries corresponding to index numbers within this upper limit (FIG. 6, 629). On the other hand, as shown in FIG. 9, the linking portion 143 may also perform linking of the class library with index number equal to the current index variable each time when processing loops within the range in which overflow of the file system portion 137 does not occur (FIG. 9, 630).

Third Embodiment

Next, the program linking program, program linking method, program linking device, and terminal device according to a third embodiment of the present invention will be explained. However, only those portions which are inherently different from the above-described second embodiment will be explained, and explanations of portions that are the same as in the second embodiment will be omitted. The third embodiment is similar to the second embodiment in that libraries are arranged in a prescribed order in advance, and in that by adding the size increase for a library to the total size increase by linking in that order, a judgment is made as to whether the library can be linked.

FIG. 10 shows the processing procedure of a terminal device according to the third embodiment. The processing procedure in FIG. 10 is inherently different from the processing procedure shown in FIG. 6 in that all libraries are sorted in advance by the link number detection portion 142 according to the size increase, with index numbers assigned in this order starting from the smallest size increase (FIG. 10, 723). Here the amount of size increase is, as stated above, the product, for each library, of the number of applications linking to the library (that is, the sharing number (n)) minus one and the size of the library (FIG. 10, 722). As stated above, the size increase is equivalent to the increase in memory capacity newly required for linking to the library.

The procedure of judging whether memory overflow occurs when linking libraries one at a time in the order of the index number is the same as the procedure according to the second embodiment (FIG. 10, 725 to 729). However, in this third embodiment the index number is assigned in increasing order of the size increase, so that the memory amount management portion1 144 judges whether library linking is possible in the increasing order of the size increase. By this means, the linking portion 143 performs linking beginning with libraries for which the size increase is as small as possible.

Further, by replacing step 729 with step 630 in FIG. 9, the class library with index number equal to the current index variable can be linked by the linking portion 143 each time processing loops within the range in which there is no overflow in the file system portion 137. This is similar to the fourth through sixth embodiments to be described below.

The portions in which the third embodiment differs inherently from the second embodiment are the portions described above. Hence explanations of other portions are omitted.

Fourth Embodiment

Next, the program linking program, program linking method, program linking device, and terminal device according to a fourth embodiment of the present invention will be explained. However, only those portions which are inherently different from the second embodiment will be explained, and explanations of portions which are the same as in the second embodiment will be omitted. The fourth embodiment is similar to the second embodiment in that libraries are arranged in a predetermined order in advance, and in that by adding the amount of size increase to the total size increase by linking in that order, a judgment is made as to whether a library can be linked.

Figure 11:
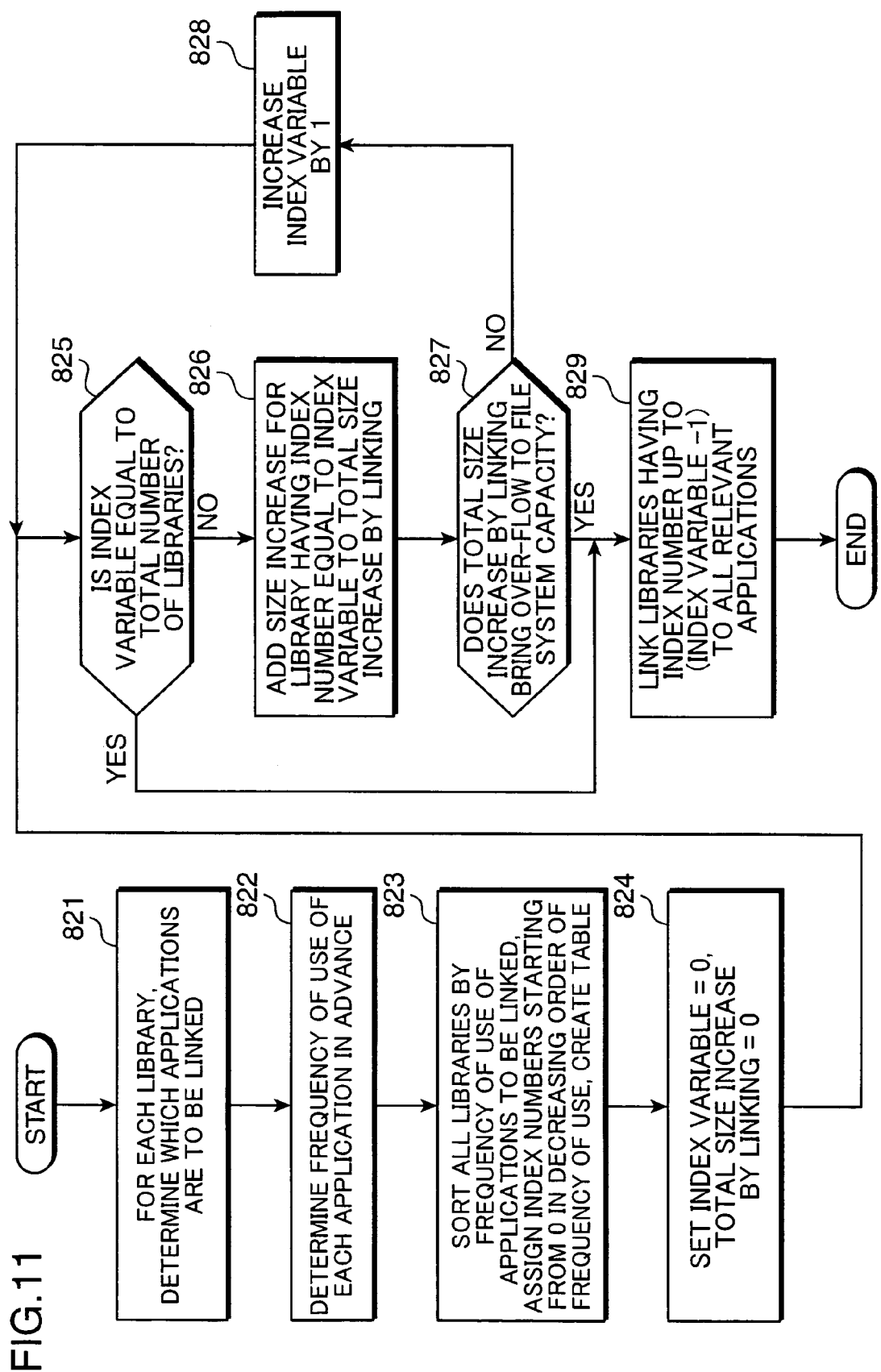
FIG. 11 shows the flow of processing of a terminal device which performs linking according to a fourth embodiment of the present invention.
Figure 12:
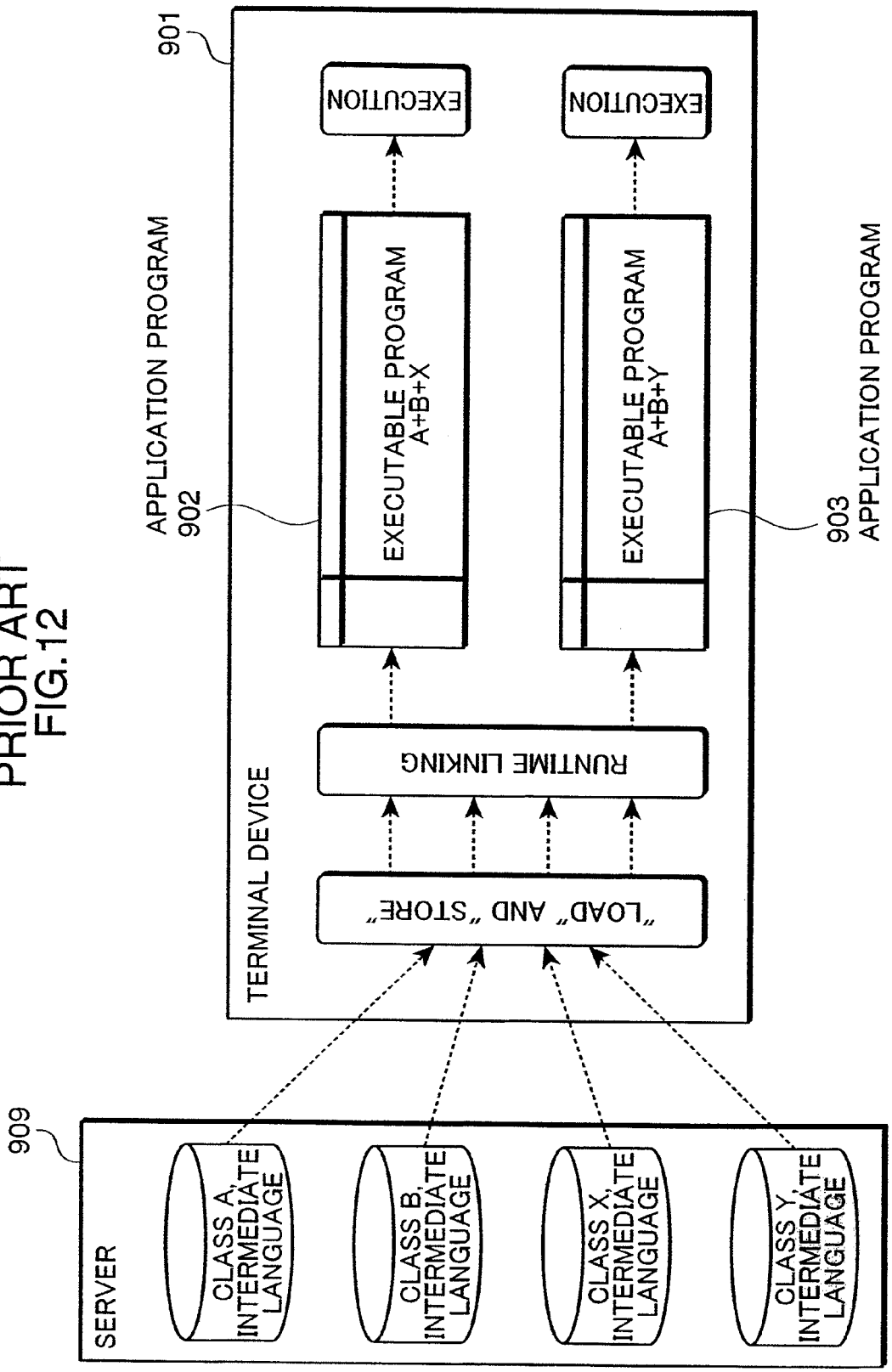
FIG. 12 shows runtime linking method as an example executed by a conventional Java (R) linker; and, FIG. 13 shows advance linking method as an example executed by a conventional C linker.
Figure 13:
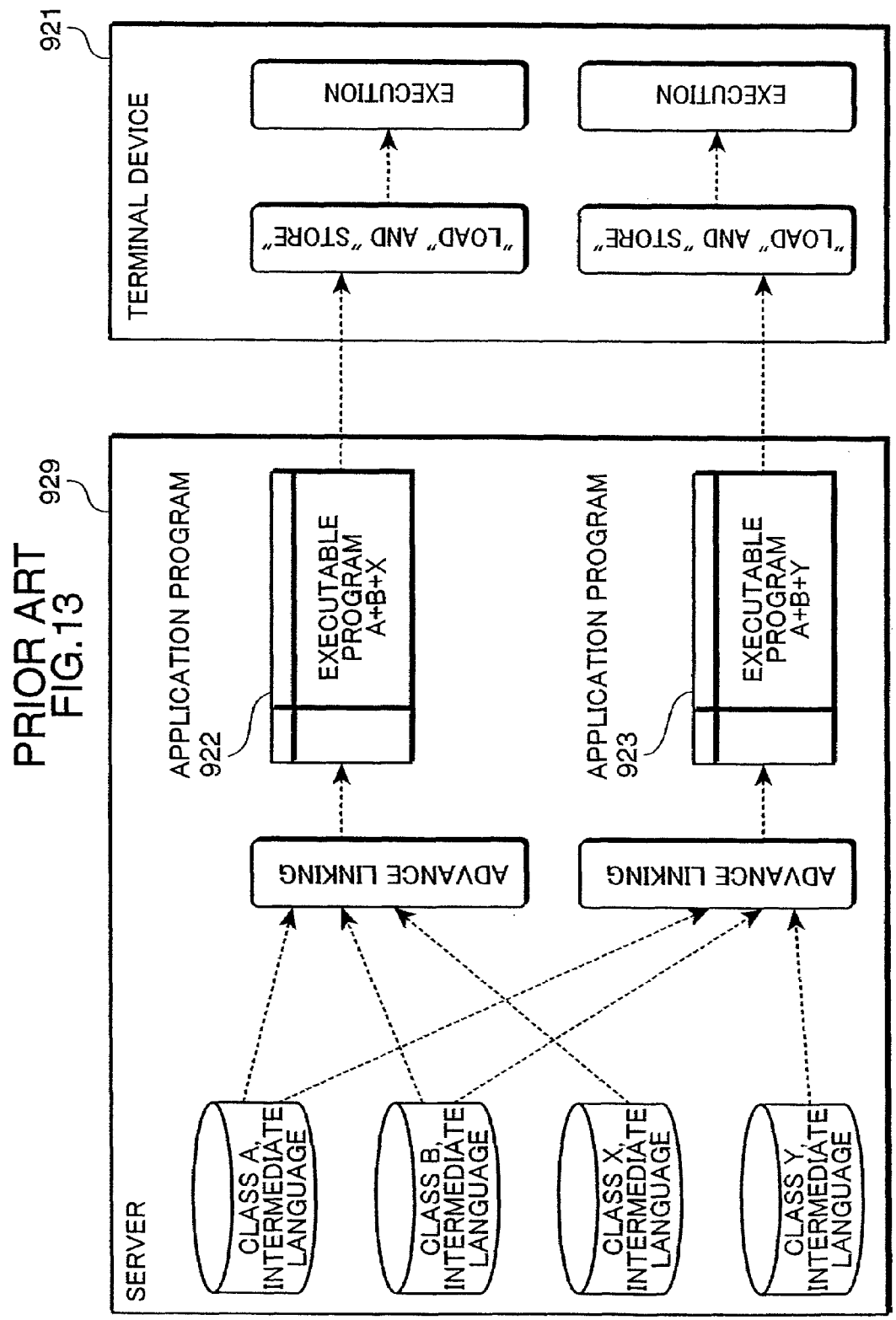

FIG. 11 shows the processing procedure of a terminal device according to the fourth embodiment. The processing procedure in FIG. 11 is inherently different from the processing procedure shown in FIG. 6 in that for all libraries, the applications to which the library is to be linked are investigated in advance by the class calling relation detection portion 146 (FIG. 11, 821), and the link number detection portion 142 estimates the frequency of use of the application (FIG. 11, 822), sorts all libraries by this frequency of use, and assigns index numbers in the order of this frequency of use (FIG. 11, 823).

For example, a certain library may be linked to an e-mail viewing application program, and the frequency of use of this e-mail viewing application program may be comparatively high, for instance five times per day on average. Or, a library may be linked to a bank fund transfer application program, and the frequency of use of this bank fund transfer application program may be comparatively low, for example several times per year on average. In such cases, the library which is linked to the e-mail viewing application program will have a lower index number assigned, and will be linked in preference to, the library which is linked to the bank fund transfer application program.

Further, one library may be linked by a plurality of applications. For example, a certain comparatively general-use library may be linked by both the above-stated e-mail viewing application program and by the bank fund transfer application program. Various methods may be adopted for determining the frequency of use of the application programs to which the library is linked.

For example, of frequencies of use of all the application programs linking the library, the highest value may be employed, the average value may be used, the median value may be used, or the total values may be used. The total values mean the sum of the frequencies of use of all the application programs linking to the library. The present invention is not limited to any of the above-stated methods.

By thus determining libraries to be linked based on the frequency of use of application programs to which a library is linked, the speed of execution of application programs with comparatively high frequencies of use can be improved, for greater convenience.

In FIG. 11, the procedure of judging whether memory overflow occurs when linking libraries one at a time in the order of the index number, is the same as the procedure according to the second embodiment (FIG. 11, 825 to 829). Portions in which this fourth embodiment differs inherently from the second embodiment have been explained above. Hence explanations of other portions are omitted.

Fifth Embodiment

Next, the program linking program, program linking method, program linking device, and terminal device according to a fifth embodiment of the present invention will be explained. However, only those portions which are inherently different from the second embodiment will be explained, and explanations of portions which are the same as in the second embodiment will be omitted. The fifth embodiment is similar to the second embodiment in that libraries are arranged in a predetermined order in advance, and in that by adding the size increase to the total size increase by linking in that order, a judgment is made as to whether a library can be linked.

The processing procedure according to the fifth embodiment is inherently different from the processing procedure according to the second embodiment in that the link number detection portion 142 sorts all libraries in advance by size, assigns index numbers in order from the smallest size, and judges, in the order of this index number, whether linking is possible. By this means, libraries with comparatively small memory sizes can be preferentially linked.

Portions in which this fifth embodiment differs inherently from the second embodiment have been explained above. Hence explanations of other portions are omitted.

Sixth Embodiment

Next, the program linking program, program linking method, program linking device, and terminal device according to a sixth embodiment of the present invention will be explained. However, only those portions which are inherently different from the second embodiment will be explained, and explanations of portions which are the same as in the second embodiment will be omitted. The sixth embodiment is similar to the second embodiment in that libraries are arranged in a predetermined order in advance, and in that by adding the size increase to the total size increase by linking in that order, a judgment is made as to whether a library can be linked.

The processing procedure according to the sixth embodiment is inherently different from the processing procedure according to the second embodiment in that the link number detection portion 142 sorts all libraries in advance by the time required for linking at runtime, assigns index numbers in order from the longest times for linking, and judges, in the order of this index number, whether linking is possible. By this means, libraries with comparatively long times for linking at runtime can be preferentially linked, so that the overall speed of execution can be improved.

Portions in which this sixth embodiment differs inherently from the second embodiment have been explained above. Hence explanations of other portions are omitted.

BRIEF DESCRIPTION OF EMBODIMENTS

A program linking program causes a computer having a memory to function as: linking means, to link one or a plurality among plural unlinked programs, advancing toward the completion of one or more linked programs; storage means, to cause the memory to store the one or more linked programs, either before or after completion; and, management means, to cause the linking means to preferentially perform linking of the plural unlinked programs in predetermined priority order up to a maximum limit, within a range in which overflow of a predetermined capacity of the memory does not occur.

In the program linking program, the management means causes the linking means to preferentially perform linking of the plural unlinked programs in predetermined priority order and to a maximum limit, within a range in which overflow of a predetermined capacity of the memory does not occur. Therefore, the speed upon execution of linked programs can be increased to the extent possible, within the limit of the capacity of the memory, which stores linked programs.

The program linking program, wherein the management means causes the linking means to perform linking, and as a result determine the maximum limit.

In the program linking program, the management means causes the linking means to perform linking, and as a result thereof determines the maximum limit for linking by the linking means, so that the maximum limit for linking can be determined more accurately.

The program linking program, wherein the management means determines the maximum limit by evaluating the sizes of the one or more linked programs at each stage of linking, without causing the linking means to perform linking.

In the program linking program, the management means determines the maximum limit to which the linking means is caused to perform linking without causing the linking means to perform linking, by evaluating the sizes of one or more linked programs at each stage of linking, so that the maximum limit for linking can be determined in a short time. Moreover, there is no need to secure excess capacity exceeding the predetermined memory capacity in order to determine the maximum limit for linking.

The program linking program, wherein the predetermined priority order is selected from at least one among increasing order of frequency of use of each of the plural unlinked programs to create the one or more linked programs; increasing order of size of each of the plural unlinked programs; increasing order of product of frequency of use of each of the plural unlinked programs to create the one or more linked programs, and size of corresponding one of the plural unlinked programs; decreasing order of time for linking each of the plural unlinked program on execution; and decreasing order of execution frequency of each of the plural unlinked programs accompanying execution of the one or more linked programs.

In the program linking program, the predetermined priority order is selected from at least one among the above-stated plurality of orders, so that unlinked programs are preferentially linked beginning with programs which impose a lighter load on memory, or which are more effective in increasing processing speed of a linked program. Thus, the speed of execution of a linked program can be more effectively increased within the limit of the memory capacity.

A program product comprises: a program linking program, which causes a computer having a memory to function as: linking means, to link one or a plurality among plural unlinked programs, advancing toward the completion of one or more linked programs; storage means, to cause the memory to store the one or more linked programs, either before or after completion; and, management means, to cause the linking means to preferentially perform linking of the plural unlinked programs in predetermined priority order and to a maximum limit, within a range in which overflow of a predetermined capacity of the memory does not occur; and, a signal holding medium that holds the program linking program.

In the program product, the management means causes the linking means to preferentially perform linking of the plural unlinked programs in predetermined priority order and to a maximum limit, within a range in which overflow of a predetermined capacity of the memory does not occur. Therefore, the speed upon execution of linked programs can be increased to the extent possible, within the limit of the capacity of the memory, which stores linked programs.

The program product, wherein the signal holding medium is at least one among a storage medium and a transmission medium.

In the program product, since the program linking program is held in the storage medium or the transmission medium, the speed upon execution of linked programs can be increased to the extent possible, within the limit of the capacity of the memory, which stores linked programs by having the program linking program read by the computer.

A program linking device comprises: a memory; a linking unit, to link one or a plurality among plural unlinked programs, advancing toward the completion of one or more linked programs; a storage unit, to cause the memory to store the one or more linked programs, either before or after completion; and, a management unit, to cause the linking unit to preferentially perform linking of the plural unlinked programs in predetermined priority order and to a maximum limit, within a range in which overflow of a predetermined capacity of the memory does not occur.

In the program linking device, the management unit causes the linking unit to preferentially perform linking of the plural unlinked programs in predetermined priority order and to a maximum limit, within a range in which overflow of a predetermined capacity of the memory does not occur. Therefore, the speed upon execution of linked programs can be increased to the extent possible, within the limit of the capacity of memory which stores linked programs.

A terminal device comprises: a memory; a linking unit, to link one or a plurality among plural unlinked programs, advancing toward the completion of one or more linked programs; a storage unit, to cause the memory to store the one or more linked programs, either before or after completion; a management unit, to cause the linking unit to preferentially perform linking of the plural unlinked programs in predetermined priority order and to a maximum limit, within a range in which overflow of a predetermined capacity of the memory does not occur; and, an execution control unit, to execute, among the one or more linked programs stored in the memory, a designated program; and wherein the execution control unit has runtime linking unit that, when a linked program to be executed is not completed as regards linking, completes the linked program to be executed by linking one or a plurality of programs from among the plural unlinked programs.

In the terminal device, the execution control unit is comprised, so that even when one or more linked programs stored in memory are not completed as regards linking, any of these can be arbitrarily selected and executed. Further, the terminal device comprises the program linking device of the present invention, so that the execution control unit can reduce the time for execution of linked programs.

The terminal device further comprises an acquisition unit to acquire the plural unlinked programs, and a storing unit to store the plural programs acquired by the acquisition unit.

In the terminal device, the acquisition unit is comprised, so that new unlinked programs can be acquired from outside. Further, the terminal device comprises the storage unit, so that a plurality of unlinked programs acquired by the acquisition unit can be saved. As a result, when the linking unit links an unlinked program, the acquisition unit need not acquire from outside, one by one, the unlinked programs for linking.

A program linking method comprises: a linking step of linking one or a plurality among plural unlinked programs, advancing toward the completion of one or more linked programs; and a storage step of storing in a memory the one or more linked programs, either before or after completion; and wherein in the linking step, linking is performed preferentially in predetermined priority order among the plural unlinked programs and to a maximum limit, within a range in which overflow of a predetermined capacity of the memory does not occur.

In the program linking method, the linking step performs linking preferentially in predetermined priority order among the plural unlinked programs and to the maximum limit, within a range in which overflow of a predetermined capacity of the memory does not occur. Therefore, the speed upon execution of linked programs can be increased to the extent possible, within the limit of the capacity of the memory, which stores linked programs.

As mentioned above, by means of the program linking program, program product, program linking device, terminal device, and program linking method of the present invention, the speed upon execution of linked programs can be increased to the extent possible, within the limit of the capacity of memory which stores linked programs. This advantage is particularly important in portable equipment with strict limits on memory capacity.

The present application is based on Japanese patent application serial No. 2003-097892, filed in Japan Patent Office on Apr. 1, 2003, the contents of which are hereby incorporated by reference.

As the present invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A program product recorded on a recording medium, comprising:
 a program linking program for causing a computer having a memory to function as:
 linking means for linking in advance a plurality of unlinked programs to form a linked program prior to execution of a plurality of applications comprising the plurality of unlinked programs;
 class calling relation detection means for detecting the plurality of unlinked programs called by each application prior to the linking;
 storage means for storing the linked program generated by the linking means in the memory before completion of the linking;
 link number detection means for estimating the frequency of use of the applications to which the unlinked programs are linked, sorting all the unlinked programs by the estimated frequency of use, and assigning indexed numbers in increasing order of the frequency of use; and
 memory management means for causing the linking means to preferentially perform linking of the plurality of unlinked programs, to form the linked program, in a predetermined priority order such that a cumulative sum of sizes of the unlinked programs is within a range in which overflow of a predetermined capacity of the memory does not occur,
 wherein the predetermined priority order is the increasing order, with the assigned index numbers, of frequency of use of the applications to which each of the plurality of unlinked programs is linked in the linked program.

2. The program product according to claim 1, wherein the management means causes the linking means to perform linking, and as a result determines the maximum cumulative sum of sizes of the unlinked programs.

3. The program product according to claim 1, wherein the management means determines the cumulative sum of sizes of the unlinked programs by evaluating the size of each of the plurality of linked programs at each stage of linking without causing the linking means to perform linking.

4. A program linking method comprising:
linking in advance a plurality of unlinked programs to form a linked program prior to execution of a plurality of applications comprising the plurality of unlinked programs; and
detecting the plurality of unlinked programs called by each application prior to the linking;
storing the linked program in a memory before completion of the linking,
estimating the frequency of use of the applications to which the unlinked programs are linked, sorting all the unlinked programs by the estimated frequency of use, and assigning indexed numbers in increasing order of the frequency of use; and
linking, preferentially, the unlinked programs to form the linked program, in a predetermined priority order among the plurality of unlinked programs such that a cumulative sum of sizes of the unlinked programs is within a range in which overflow of a predetermined capacity of the memory does not occur, and
wherein the predetermined priority order is the increasing order, with the assigned index numbers, of frequency of use of the applications to which each of the plurality of unlinked programs is linked in the linked program.

5. A program product recorded on a recording medium, comprising:
a program linking program for causing a computer having a memory to function as:
linking means for linking in advance a plurality of unlinked programs to form a linked program prior to execution of a plurality of applications comprising the plurality of unlinked programs;
class calling relation detection means for detecting the plurality of unlinked programs called by each application prior to the linking;
storage means for storing the linked program generated by the linking means in the memory before completion of the linking;
detection means for estimating the time required for linking at runtime, sorting all the unlinked programs by the estimated time, and assigning indexed numbers in decreasing order of time required for linking at runtime; and
memory management means for causing the linking means to preferentially perform linking of the plurality of unlinked programs, to form the linked program, in a predetermined priority order such that a cumulative sum of sizes of the unlinked programs is within a range in which overflow of a predetermined capacity of the memory does not occur,
wherein the predetermined priority order is the decreasing order, with the assigned index numbers, of time for linking of the applications to which each of the plurality of unlinked programs is linked in the linked program upon execution.

6. A program linking method comprising:
linking in advance a plurality of unlinked programs to form a linked program prior to execution of a plurality of applications comprising the plurality of unlinked programs; and
detecting the plurality of unlinked programs called by each application prior to the linking;
storing the linked program in a memory before completion of the linking,
estimating the time required for linking at runtime, sorting all the unlinked programs by the estimated time, and assigning indexed numbers in decreasing order of time required for linking at runtime; and
linking preferentially, the plurality of unlinked programs to form the linked program, in a predetermined priority order among the plurality of unlinked programs such that a cumulative sum of sizes of the unlinked programs is within a range in which overflow of a predetermined capacity of the memory does not occur, and
wherein the predetermined priority order is the decreasing order, with the assigned index numbers, of time for linking of the applications to which each of the plurality of unlinked programs is linked in the linked program, upon execution.

* * * * *